United States Patent
Stanjek et al.

(10) Patent No.: US 10,040,908 B2
(45) Date of Patent: Aug. 7, 2018

(54) CROSS-LINKABLE MASSES BASED ON ORGANYLOXYSILANE-TERMINATED POLYMERS

(71) Applicant: Wacker Chemie AG, Munich (DE)

(72) Inventors: Volker Stanjek, Ampfing (DE); Andreas Bauer, Kirchdorf (DE); Lars Zander, Altoetting (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 15/314,735

(22) PCT Filed: May 13, 2015

(86) PCT No.: PCT/EP2015/060645
§ 371 (c)(1),
(2) Date: Nov. 29, 2016

(87) PCT Pub. No.: WO2015/180968
PCT Pub. Date: Dec. 3, 2015

(65) Prior Publication Data
US 2017/0198101 A1    Jul. 13, 2017

(30) Foreign Application Priority Data
May 30, 2014 (DE) ........................ 10 2014 210 309

(51) Int. Cl.
| | |
|---|---|
| C08G 77/26 | (2006.01) |
| C08K 9/00 | (2006.01) |
| C08K 9/10 | (2006.01) |
| C09J 183/12 | (2006.01) |
| C08G 77/46 | (2006.01) |
| C09D 183/12 | (2006.01) |
| C08G 77/00 | (2006.01) |

(52) U.S. Cl.
CPC ............. *C08G 77/26* (2013.01); *C08G 77/46* (2013.01); *C08K 9/00* (2013.01); *C08K 9/10* (2013.01); *C09D 183/12* (2013.01); *C09J 183/12* (2013.01); *C08G 77/80* (2013.01); *C08K 2201/003* (2013.01)

(58) Field of Classification Search
None
See application file for complete search history.

(56) References Cited

U.S. PATENT DOCUMENTS

| | | | |
|---|---|---|---|
| 6,884,852 B1 | 4/2005 | Klauck et al. | |
| 8,372,514 B2 * | 2/2013 | Oertli | C08G 18/10 156/329 |
| 2005/0119421 A1 * | 6/2005 | Schindler | C08G 18/10 525/452 |
| 2005/0119436 A1 | 6/2005 | Ziche et al. | |
| 2006/0217514 A1 * | 9/2006 | Araki | C08L 83/04 528/17 |
| 2007/0167598 A1 | 7/2007 | Stanjek et al. | |
| 2007/0287780 A1 * | 12/2007 | Wakabayashi | C08G 65/336 524/188 |
| 2009/0131591 A1 * | 5/2009 | Schindler | C08G 65/336 525/105 |
| 2010/0016537 A1 | 1/2010 | Bamann et al. | |
| 2011/0236586 A1 * | 9/2011 | Bauer | C08G 65/336 427/387 |
| 2012/0055105 A1 * | 3/2012 | Kohl | C08G 65/336 52/173.3 |
| 2012/0065308 A1 * | 3/2012 | Sumi | C08K 5/0091 524/139 |
| 2013/0029037 A1 * | 1/2013 | Stanjek | C08G 65/336 427/140 |
| 2014/0155545 A1 | 6/2014 | Stanjek et al. | |
| 2015/0007938 A1 | 1/2015 | Stanjek et al. | |

FOREIGN PATENT DOCUMENTS

| | | |
|---|---|---|
| DE | 10 2011 081 264 A1 | 2/2013 |
| DE | 10 2012 201 734 A1 | 8/2013 |
| EP | 0 918 062 A1 | 5/1999 |
| EP | 1093482 B1 | 4/2001 |
| EP | 1535940 A1 | 6/2005 |
| EP | 1641854 B1 | 4/2006 |
| EP | 1896523 B1 | 3/2008 |
| JP | 2007269935 A | 10/2007 |
| JP | 2011052202 A2 | 3/2011 |
| JP | 2012197388 A2 | 10/2012 |
| WO | 13058293 A1 | 4/2013 |

* cited by examiner

*Primary Examiner* — Robert S Loewe
(74) *Attorney, Agent, or Firm* — Brooks Kushman P.C.

(57) ABSTRACT

The objectionable odor of one component condensation curable organopolysiloxane compositions is eliminated by replacing all or the most substantial part of water scavenger vinyltrimethoxysilane with a phenyltrialkoxysilane, without compromising storage or curing properties.

13 Claims, No Drawings

CROSS-LINKABLE MASSES BASED ON ORGANYLOXYSILANE-TERMINATED POLYMERS

CROSS REFERENCE TO RELATED APPLICATIONS

This application is the U.S. National Phase of PCT Appln. No. PCT/EP2015/060645 filed May 13, 2015, which claims priority to German Application No. 10 2014 210 309.6 filed May 30, 2014, the disclosures of which are incorporated in their entirety by reference herein.

BACKGROUND OF THE INVENTION

1. Field of the Invention

The invention relates to crosslinkable compositions of silane-crosslinking prepolymers and to their methods of making and use as adhesive and sealant materials, in particular for adhesive bonding of substrates.

2. Description of the Related Art

Polymer systems having reactive alkoxysilyl groups are well known. On contact with water and/or atmospheric humidity, these alkoxysilane-terminated polymers are able to condense with each other even at room temperature by eliminating the alkoxy groups. One of the most important applications for such materials is in the manufacture of adhesives, particularly the manufacture of adhesive systems that are elastic.

This is because adhesives based on alkoxysilane-crosslinking polymers exhibit very good mechanical properties in the cured state, since they are able to combine tensile strength with high elasticity. A further decisive advantage of silane-crosslinking systems over numerous other adhesive and sealant technologies (over isocyanate-crosslinking systems, for example) is the fact that the prepolymers exhibit no concerns. There are many applications in this area where there is a preference for one-component systems (1K systems) that cure on contact with atmospheric humidity.

Nearly all silane-crosslinking adhesive and sealant materials contain what are known as water scavengers. These are usually indispensable for an economical manufacturing process, since it is generally not carried out under perfect protective-gas conditions, causing trace moisture to become entrapped in the product during formation and packaging. Moreover, the solid fillers included in what are known as "filled systems" always entrain a certain amount of moisture absorbed on the particle surfaces. Without water scavengers, these trace amounts of water would lead directly to a condensation reaction involving at least some of the polymer molecules and hence to some undesired stiffening of the resulting composition.

Moreover, most of the containers in which adhesive and sealant materials are stored are neither absolutely watertight nor made of materials that would completely prevent any diffusion of water. Again, water scavengers are indispensable here to ensure adequate stability in storage.

Water scavengers work by chemically reacting with the trace water entrained in the particular product, so the trace water is no longer available for a reaction with the silane-crosslinking polymers.

Vinyltrimethoxysilane is virtually always used as a water scavenger in silane-crosslinking systems. EP 0 918 062 A1 may be cited here as representative of the many documents in which this practice is described, for its clear overview and description of typical ingredients in silane-crosslinking adhesive and sealant materials.

The reason for the indispensability of vinyltrimethoxysilane in nearly all commercially relevant silane-crosslinking adhesive and sealant formulations is particularly the high reactivity of this silane as well as its inexpensive availability: the half-life of vinyltrimethoxysilane in an aqueous solution is just 855 s at pH 7 and <10 s at pH 9. That is, more than half of all silane molecules will have reacted with water at the end of this period. Half-lives of silanes without Si-bonded vinyl group are distinctly longer here in that, for instance, methyltrimethoxysilane has a half life of 3360 s at pH 7 and 111 s at pH 9, 3-methacryloyloxypropyltrimethoxysilane has half-lives of 8500 s at pH 7 and 185 min at pH 9, and the half-lives of 3-glycidoxypropyltrimethoxysilane are 6500 s at pH 7 and 240 s at pH 9.

Since most silane-terminated organic polymers have silyl groups attached to the polymer moiety via a propyl spacer, their reactivities are comparable to those of the last two polymers mentioned, which are likewise propyl spaced. Vinyltrimethoxysilane accordingly has not just a higher reactivity toward water than virtually all other silanes, but also a higher reactivity than the silane-crosslinking polymer to be protected by it from any premature reaction with moisture. This is one very important property for a water scavenger.

Only the so-called alpha-silanes as described in EP 1414909 A for example are even more reactive than vinyltrimethoxysilane. They have a reactive alkoxysilyl group attached through a methylene spacer to an adjacent heteroatom. This arrangement, like the vinyl group of vinyltrimethoxysilane, leads to an appreciable increase in the reactivity of the silyl group in question. However, alpha-silanes are burdensome to synthesize and so are significantly more costly than vinyltrimethoxysilane and therefore do not represent an economically sensible alternative.

However, notwithstanding its extremely wide use, vinyltrimethoxysilane also has some disadvantages. Having a boiling point of 122° C. at 1013 mbar, this silane is relatively volatile and also has an odor which some users perceive as very unpleasant. Similarly, its ISO 13736 flashpoint is, at just 25° C., relatively low, compromising its processability. Yet these disadvantages notwithstanding, to date it is the advantages such as the low cost and also the good mechanical properties of the corresponding compositions after curing which have hitherto made vinyltrimethoxysilane an indispensable ingredient in almost all common formulations of adhesive and sealant materials.

SUMMARY OF THE INVENTION

The object of the invention was therefore that of the problem of providing water scavengers not having the disadvantages of the prior art. These and other objects are obtained by the invention, which provides a crosslinkable composition containing (A) 100 parts by weight of a compound of the formula

$$Y\text{---}[(CR^1{}_2)_b\text{---}SiR_a(OR^2)_{3-a}]_x \qquad (I),$$

where

Y represents an x-valent polymeric moiety attached via nitrogen, oxygen, sulfur or carbon, R at each occurrence may be the same or different and represents a monovalent, optionally substituted hydrocarbyl moiety, $R^1$ at each occurrence may be the same or different and represents a hydrogen atom or a monovalent, optionally substituted hydrocarbyl moiety, which may be attached to the carbon atom via nitrogen, phosphorus, oxygen, sulfur or a carbonyl group, $R^2$ at each occurrence may be the same or different and represents a hydrogen atom or a monovalent, optionally substituted hydrocarbyl moiety, x is an integer from 1 to 10, preferably 1, 2 or 3, more preferably 1 or 2, a at each occurrence may be the same or different and is 0, 1 or 2, preferably 0 or 1, and b at each occurrence may be the same or different and is an integer from 1 to 10, preferably 1, 3 or 4, more preferably 1 or 3, specifically 1, (B) at least 0.2 part by weight of a phenyltrialkoxysilane of the formula

$$C_6H_5\text{---}Si(OR^3)_3 \qquad (II),$$

where $R^3$ at each occurrence may be the same or different and represents methyl or ethyl, (c) 0.1 to 30 parts by weight of a nitrogenous organosilicon compound containing a unit of the formula

$$D_e Si(OR^5)_d R^4_c O_{(4-e-d-c)/2} \qquad (III),$$

where $R^4$ at each occurrence may be the same or different and represents a monovalent, optionally substituted, SiC-bonded organic moiety free of nitrogen, $R^5$ at each occurrence may be the same or different and represents a hydrogen atom or an optionally substituted hydrocarbyl moiety, D at each occurrence may be the same or different and represents a monovalent SiC-bonded moiety having at least one nitrogen atom not bonded to the carbonyl group (C=O), c is 0, 1, 2 or 3, preferably 0 or 1, more preferably 0, d is 1, 2 or 3, preferably 2 or 3, more preferably 3, and e is 0, 1, 2, 3 or 4, preferably 1, with the proviso that the c+d+e sum is not more than 4 and at least one D moiety is present per molecule, wherein the crosslinkable composition contains less than 0.5 wt % of vinyltrimethoxysilane, based on the total weight of the crosslinkable composition.

DETAILED DESCRIPTION OF THE PREFERRED EMBODIMENTS

The invention is based on the surprising discovery that the phenyltrialkoxysilanes (B) are able to replace vinyltrimethoxysilane as water scavenger without degrading the properties of the resulting composition.

Examples of R moieties are alkyl moieties such as methyl, ethyl, n-propyl, isopropyl, 1-n-butyl, 2-n-butyl, isobutyl, tert-butyl, n-pentyl, isopentyl, neopentyl, and tert-pentyl; hexyl moieties such as n-hexyl; heptyl moieties such as n-heptyl; octyl moieties such as n-octyl, isooctyl moieties and 2,2,4-trimethylpentyl; nonyl moieties such as n-nonyl; decyl moieties such as n-decyl; dodecyl moieties such as n-dodecyl; octadecyl moieties such as n-octadecyl; cycloalkyl moieties such as cyclopentyl, cyclohexyl, cycloheptyl and methylcyclohexyl; alkenyl moieties such as vinyl, 1-propenyl and 2-propenyl; aryl moieties such as phenyl, naphthyl, anthryl and phenanthryl; alkaryl moieties such as o-, m-, p-tolyl, xylyl and ethylphenyl; and aralkyl moieties such as benzyl, α-phenylethyl and β-phenylethyl.

Examples of substituted moieties R are haloalkyl moieties such as 3,3,3-trifluoro-n-propyl, 2,2,2",2",2",2"-hexafluoroisopropyl and heptafluoroisopropyl, and haloaryl moieties such as o-, m- and p-chlorophenyl.

Moiety R preferably comprises optionally halogen-substituted monovalent hydrocarbyl moieties having 1 to 6 carbon atoms, more preferably alkyl moieties having 1 or 2 carbon atoms, specifically methyl.

Examples of $R^1$ moieties are hydrogen, the moieties indicated for R, and also optionally substituted hydrocarbyl moieties bonded to the carbon atom via nitrogen, phosphorus, oxygen, sulfur, carbon or a carbonyl group. Moiety $R^2$ more preferably comprises hydrogen and hydrocarbyl moieties having 1 to 20 carbon atoms, specifically, hydrogen.

Examples of $R^2$ moieties are hydrogen and the examples indicated for moiety R. Preferably, moiety $R^2$ comprises a hydrogen atom or optionally halogen-substituted alkyl moieties having 1 to 10 carbon atoms, more preferably alkyl moieties having 1 to 4 carbon atoms, specifically methyl and ethyl.

Polymeric moiety Y represents the residue of any polymer where, for the purposes of the present invention, at least 50%, preferably at least 70% and more preferably at least 90% of all bonds in the main chain are carbon-carbon, carbon-nitrogen or carbon-oxygen bonds. Examples of polymeric moieties Y are polyester, polyether, polyurethane, polyalkylene and polyacrylate moieties.

Polymeric moiety Y preferably comprises organic polymeric moieties where the polymer chain comprises polyoxyalkylenes, such as polyoxyethylene, polyoxypropylene, polyoxybutylene, polyoxytetramethylene, polyoxyethylene-polyoxypropylene copolymer and polyoxypropylene-polyoxybutylene copolymer; hydrocarbon polymers such as polyisobutylene and copolymers of polyisobutylene with isoprene; polychloroprenes; polyisoprenes; polyurethanes; polyesters; polyamides; polyacrylates; polymethacrylates; vinyl polymer and polycarbonates; and where the attachment to the —[(CR$^1_2$)$_b$—SiR$_a$(OR$^2$)$_{3-a}$] group or groups is preferably via —O—C(=O)—NH—, —NH—C(=O)O—, —NH—C(=O)—NH—, —NR'—C(=O)—NH—, NH—C(=O)—NR'—, —NH—C(=O)—, —C(=O)—NH—, —C(=O)—O—, —O—C(=O)—, —O—C(=O)—O—, —S—C(=O)—NH—, —NH—C(=O)—S—, —C(=O)—S—, —S—C(=O)—, —S—C(=O)—S—, —C(=O)—, —S—, —O—, —NR'—, wherein R' at each occurrence may be the same or different and has a meaning recited for R or represents a —CH(COOR")—CH$_2$—COOR" group, where R" at each occurrence may be the same or different and has a meaning recited for R.

Moiety R' preferably comprises a —CH(COOR")—CH$_2$—COOR" group or an optionally substituted hydrocarbyl moiety having 1 to 20 carbon atoms, more preferably a linear, branched or cyclic alkyl group having 1 to 20 carbon atoms or comprises an optionally halogen-substituted aryl group having 6 to 20 carbon atoms.

Examples of R' moieties are cyclohexyl, cyclopentyl, n-propyl, isopropyl, n-butyl, isobutyl and t-butyl, the various stereoisomers of pentyl, of hexyl or of heptyl, and also phenyl.

The R" moieties preferably comprise alkyl groups having 1 to 10 carbon atoms and more preferably comprise methyl, ethyl or propyl.

The —[(CR$^1_2$)$_b$—SiR$_a$(OR$^2$)$_{3-a}$] groups attached as described may be present in component (A) at any desired position of the polymer chain, for instance internally and/or terminally.

Moiety Y preferably comprises polyurethane moieties or polyoxyalkylene moieties, more preferably catenary polyurethane moieties or catenary polyoxyalkylene moieties each having from 0 to 3 branching sites having terminally attached —[(CR$^1_2$)$_b$—SiR$_a$(OR$^2$)$_{3-a}$] groups, the term branching sites to be understood for the purposes of the invention as meaning any branch off the main chain with more than one carbon atom, while the moieties and indices are each as defined above.

Moiety Y in formula (I) particularly comprises catenary polyurethane moieties or catenary polyoxyalkylene moieties without branching sites having terminally attached —[(CR$^1_2$)$_b$—SiR$_a$(OR$^2$)$_{3-a}$] groups, where the moieties and indices are each as defined above.

Moieties Y preferably comprise polyurethane moieties whose chain ends are bonded to the —[(CR$^1_2$)$_b$—SiR$_a$(OR$^2$)$_{3-a}$] group or groups via —NH—C(=O)O—, —NH—C(=O)—NH—, —NR'—C(=O)—NH— or —NH—C(=O)—NR'—, in particular via —O—C(=O)—NH— or —NH—C(=O)—NR'—, where all moieties and indices are each as defined above. The Y polyurethane moieties are preferably obtainable from linear or branched polyoxyalkylenes, in particular from polypropylene glycols, and di- or polyisocyanates. The Y moieties preferably have average molar masses $M_n$ (number average) of 400 to 30,000 g/mol, more preferably of 4000 to 20,000 g/mol. Suitable methods of preparing a corresponding component (A) and also examples of component (A) itself are described inter alia in EP 1 093 482 B1 (paragraphs [0014]-[0023], [0039]-[0055] and also Example 1 and Comparative Example 1) or EP 1 641 854 B1 (paragraphs [0014]-[0035], Examples 4 and 6 and also Comparative Examples 1 and 2), which are incorporated herein by reference.

The number average molar mass $M_n$ is determined within the purview of the present invention by size exclusion chromatography (SEC) against a polystyrene standard, in THF, at 60° C., at a flow rate of 1.2 ml/min and refractive index (RI) detection on a Styragel HR3-HR4-HR5-HR5 column set from Waters Corp. USA using an injection volume of 100 µl.

Polyoxyalkylene moieties Y preferably comprise linear or branched polyoxyalkylene moieties, more preferably polyoxypropylene moieties whose chain ends are preferably bonded to the –[(CR$^1_2$)$_b$—SiR$_a$(OR$^2$)$_{3-a}$] group or groups via —O—C(=O)—NH— or —O—, where the moieties and indices are each as defined above. Preferably at least 85%, more preferably at least 90% and specifically at least 95%, of all chain ends are bonded to the —[(CR$^1_2$)$_b$—SiR$_a$(OR$^2$)$_{3-a}$] group via —O—C(=O)—NH—. The Y polyoxyalkylene moieties preferably have average molar masses $M_n$ of 4000 to 30,000 g/mol, preferably 8000 to 20,000 g/mol. Suitable methods of making a corresponding component (A) and also examples of component (A) itself are described inter alia in EP 1 535 940 B1 (paragraphs [0005]-[0025] and also Examples 1-3 and Comparative Examples 1-4) or EP 1 896 523 B1 (paragraphs [0008]-[0047]), which are incorporated herein by reference.

The end groups of the (A) compounds employed according to the invention preferably comprise those of the general formulae

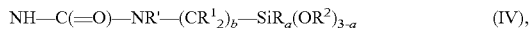

NH—C(=O)—NR'—(CR$^1_2$)$_b$—SiR$_a$(OR$^2$)$_{3-a}$    (IV),

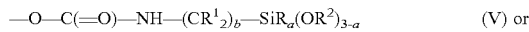

—O—C(=O)—NH—(CR$^1_2$)$_b$—SiR$_a$(OR$^2$)$_{3-a}$    (V) or

—O—(CR$^1_2$)$_b$—SiR$_a$(OR$^2$)$_{3-a}$    (VI), where the moieties and indices are each as defined above.

When the (A) compounds comprise polyurethanes, which is preferable, these polyurethanes preferably have one or more of the end groups

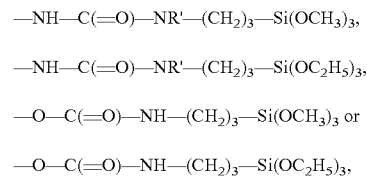

—NH—C(=O)—NR'—(CH$_2$)$_3$—Si(OCH$_3$)$_3$,

—NH—C(=O)—NR'—(CH$_2$)$_3$—Si(OC$_2$H$_5$)$_3$,

—O—C(=O)—NH—(CH$_2$)$_3$—Si(OCH$_3$)$_3$ or

—O—C(=O)—NH—(CH$_2$)$_3$—Si(OC$_2$H$_5$)$_3$, where R' is as defined above.

When the (A) compounds comprise polypropylene glycols, which is particularly preferable, these polypropylene glycols preferably have one or more of the end groups —O—(CH$_2$)$_3$—Si(CH$_3$)(OCH$_3$)$_2$, —O—(CH$_2$)$_3$—Si(OCH$_3$)$_3$,

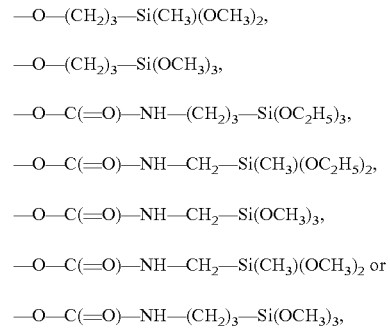

—O—C(=O)—NH—(CH$_2$)$_3$—Si(OC$_2$H$_5$)$_3$,

—O—C(=O)—NH—CH$_2$—Si(CH$_3$)(OC$_2$H$_5$)$_2$,

—O—C(=O)—NH—CH$_2$—Si(OCH$_3$)$_3$,

—O—C(=O)—NH—CH$_2$—Si(CH$_3$)(OCH$_3$)$_2$ or

—O—C(=O)—NH—(CH$_2$)$_3$—Si(OCH$_3$)$_3$, where the two last-mentioned end groups are particularly preferred.

The average molecular weights $M_n$ of compounds (A) are preferably at least 400 g/mol, more preferably at least 4000 g/mol, specifically at least 10,000 g/mol, and preferably at most 30,000 g/mol, more preferably at most 20,000 g/mol, specifically at most 19,000 g/mol.

The viscosity of compounds (A) is preferably at least 0.2 Pas, more preferably at least 1 Pas, yet more preferably at least 5 Pas, and preferably at most 700 Pas, more preferably at most 100 Pas, all measured at 20° C.

The viscosity of nonpasty liquids is determined within the purview of the present invention after temperature regulation to 23° C., using a DV 3 P rotary viscometer from A. Paar (Brookfield systems) by use of spindle 6 at 5 Hz in accordance with ISO 2555.

The (A) compounds employed according to the invention are commercially available products or are obtainable by chemically routine methods.

Polymers (A) are obtainable by known methods, such as addition reactions, e.g., hydrosilylation, Michael addition, Diels-Alder addition or reactions between isocyanate-functional compounds with compounds having isocyanate-reactive groups.

The (A) component employed according to the invention may contain mixtures of different species of compounds of formula (I) as well as just one species of compound of formula (I). In fact, component (A) may exclusively contain compounds of formula (I) where more than 90%, preferably more than 95% and more preferably more than 98% of all silyl groups attached to the Y moiety are identical. However, it is also possible to use a component (A) which at least in part contains compounds of formula (I) wherein different silyl groups are bonded to one Y moiety. Finally, component (A) may also comprise mixtures of various compounds of formula (I) in each of which there are present altogether at least 2 different species of silyl groups bonded to Y moieties, but all silyl groups bonded to any one Y moiety are identical.

The concentrations at which compounds (A) are contained in the compositions of the invention are preferably at most 60 wt %, more preferably at most 40 wt %, and preferably at least 10 wt %, more preferably at least 15 wt %.

Component (B) preferably comprises phenyltrimethoxysilane.

The phenyltrimethoxysilane which is preferably employed according to the invention has a boiling point in the range of 210-212° C. at 1013 hPa and a flashpoint of 96° C. (as measured to ISO 3679). The phenyltrimethoxysilane which is preferably used has a half-life of 1330 s at pH 7 and 72 s at pH 9.

The amounts in which component (B) is contained in the compositions of the invention are preferably from 0.5 to 50 parts by weight, more preferably from 0.8 to 30 parts by weight, and specifically from 1 to 20 parts by weight, all based on 100 parts by weight of component (A).

The (C) organosilicon compounds employed in the compositions of the invention may comprise not only silanes, i.e. compounds of formula (III) where c+d+e=4, but also siloxanes, i.e., compounds containing units of formula (III) where c+d+e≤3, and preferably here comprise silanes.

Examples of moiety $R^4$ are the examples indicated for R.

Moiety $R^4$ preferably comprises optionally halogen-substituted hydrocarbyl moieties having 1 to 18 carbon atoms and more preferably comprises hydrocarbyl moieties having 1 to 5 carbon atoms and specifically comprises methyl.

Examples of optionally substituted hydrocarbyl moieties $R^5$ are the examples indicated for the R moiety.

The $R^5$ moieties preferably comprise hydrogen and optionally halogen-substituted hydrocarbyl moieties having 1 to 18 carbon atoms, more preferably hydrogen and hydrocarbyl moieties having 1 to 10 carbon atoms, and specifically methyl and ethyl.

Examples of moieties D are moieties of the formulae $H_2N(CH_2)_3$—, $H_2N(CH_2)_2NH(CH_2)_3$—, $H_2N(CH_2)_2NH(CH_2)_2NH(CH_2)_3$—, $H_3CNH(CH_2)_3$—, $C_2H_5NH(CH_2)_3$—, $C_3H_7NH(CH_2)_3$—, $C_4H_9NH(CH_2)_3$—, $C_5H_{11}NH(CH_2)_3$—, $C_6H_{13}NH(CH_2)_3$—, $C_7H_{15}NH(CH_2)_3$—, $H_2N(CH_2)_4$—, $H_2N$—$CH_2$—$CH(CH_3)$—$CH_2$—, $H_2N(CH_2)_5$—, cyclo-$O_5H_9NH(CH_2)_3$—, cyclo-$C_6H_{11}NH(CH_2)_3$—, phenyl-NH$(CH_2)_3$—, $(CH_3)_2N(CH_2)_3$—, $(C_2H_5)_2N(CH_2)_3$—, $(C_3H_7)_2N(CH_2)_3$—, $(C_4H_9)_2N(CH_2)_3$—, $(C_5H_{11})_2N(CH_2)_3$—, $(C_6H_{13})_2N(CH_2)_3$—, $(C_7H_{15})_2N(CH_2)_3$—, $H_2N(CH_2)$—, $H_2N(CH_2)_2NH(CH_2)$—, $H_2N(CH_2)_2NH(CH_2)_2NH(CH_2)$—, $CH_3NH(CH_2)$—, $C_2H_5NH(CH_2)$—, $C_3H_7NH(CH_2)$—, $C_4H_9NH(CH_2)$, $C_5H_{11}NH(CH_2)$—, $C_6H_{13}NH(CH_2)$—, $C_7H_{15}NH(CH_2)$—, cyclo-$O_5H_9NH(CH_2)$—, cyclo-$C_6H_{11}NH(CH_2)$—, phenyl-NH$(CH_2)$—, $(CH_3)_2N(CH_2)$ $(C_2H_5)_2N(CH_2)$—, $(C_3H_7)_2N(CH_2)$—, $(C_4H_9)_2N(CH_2)$—, $(C_5H_1)_2N(CH_2)$, $(C_6H_{13})_2N(CH_2)$—, $(C_7H_{15})_2N(CH_2)$—, $(CH_3O)_3Si(CH_2)_3NH(CH_2)_3$, $(C_2H_5O)_3Si(CH_2)_3NH(CH_2)_3$—, $(CH_3O)_2(CH_3)Si(CH_2)_3NH(CH_2)_3$— and $(C_2H_5O)_2(CH_3)Si(CH_2)_3NH(CH_2)_3$— and also reaction products of the abovementioned primary amino groups with compounds containing epoxy groups or double bonds having reactivity toward primary amino groups.

Moiety D preferably comprises $H_2N(CH_2)_3$—, $H_2N(CH_2)_2NH(CH_2)_3$— and cyclo-$C_6H_{11}NH(CH_2)_3$—.

Examples of formula (III) silanes optionally employed according to the invention are $H_2N(CH_2)_3$—$Si(OCH_3)_3$, $H_2N(CH_2)_3$—$Si(OC_2H_5)_3$, $H_2N(CH_2)_3$—$Si(OCH_3)_2CH_3$, $H_2N(CH_2)_3$—$Si(OC_2H_5)_2CH_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, $H_2N(CH_2)_2NH(CH_2)_3$—$Si(OC_2H_5)_2CH_3, H_2N(CH_2)_2NH(CH_2)_3$—$Si(OH)_3$, $H_2N(CH_2)_2NH(CH_2)_3$—$Si(OH)_2CH_3$, $H_2N(CH_2)_2NH(CH_2)_2NH(CH_2)_3$—$Si(OCH_3)_3$, $H_2N(CH_2)_2NH(CH_2)_2NH(CH_2)_3$—$Si(OC_2H_5)_3$, cyclo-$C_6H_{11}NH(CH_2)_3$—$Si(OCH_3)_3$, cyclo-$C_6H_{11}NH(CH_2)_3$—$Si(OC_2H_5)_3$, cyclo-$C_6H_{11}NH(CH_2)_3$—$Si(OCH_3)_2CH_3$, cyclo-$C_6H_{11}NH(CH_2)_3$—$Si(OC_2H_5)_2CH_3$, cyclo-$C_6H_{11}NH(CH_2)_3$—$Si(OH)_3$, cyclo-$C_6H_{11}NH(CH_2)_3$—$Si(OH)_2CH_3$, phenyl-NH$(CH_2)_3$—$Si(OCH_3)_3$, phenyl-NH$(CH_2)_3$—$Si(OC_2H_5)_3$, phenyl-NH$(CH_2)_3$—$Si(OCH_3)_2CH_3$, phenyl-NH$(CH_2)_3$—$Si(OC_2H_5)_2CH_3$, phenyl-NH$(CH_2)_3$—$Si(OH)_3$, phenyl-NH$(CH_2)_3$—$Si(OH)_2CH_3$, $HN((CH_2)_3$—$Si(OCH_3)_3)_2$, $HN((CH_2)_3$—$Si(OC_2H_5)_3)_2$, $HN((CH_2)_3$—$Si(OCH_3)_2CH_3)_2$, $HN((CH_2)_3$—$Si(OC_2H_5)_3)_2$, cyclo-$C_6H_{11}NH(CH_2)$—$Si(OCH_3)_3$, cyclo-$C_6H_{11}NH(CH_2)$—$Si(OC_2H_5)_3$, cyclo-$C_6H_{11}NH(CH_2)$—$Si(OCH_3)_2CH_3$, cyclo-$C_6H_{11}NH(CH_2)$—$Si(OC_2H_5)_2CH_3$, cyclo-$C_6H_{11}NH(CH_2)$—$Si(OH)_3$, cyclo-$C_6H_{11}NH(CH_2)$—$Si(OH)_2CH_3$, phenyl-NH$(CH_2)$—$Si(OCH_3)_3$, phenyl-NH$(CH_2)$—$Si(OC_2H_5)_3$, phenyl-NH$(CH_2)$—$Si(OCH_3)_2CH_3$, phenyl-NH$(CH_2)$—$Si(OC_2H_5)_2CH_3$, phenyl-NH$(CH_2)$—$Si(OH)_3$ and phenyl-NH$(CH_2)$—$Si(OH)_2CH_3$ and also their partial hydrolyzates, of which $H_2N(CH_2)_3$—$Si(OCH_3)_3$, $H_2N(CH_2)_3$—$Si(OC_2H_5)_3$, $H_2N(CH_2)_2NH(CH_2)_3$—$Si(OCH_3)_3$, $H_2N(CH_2)_2NH(CH_2)_3$—$Si(OC_2H_5)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OC_2H_5)_3$ and cyclo-$C_6H_{11}NH(CH_2)_3$—$Si(OCH_3)_2CH_3$ and also their respective partial hydrolyzates are preferable and $H_2N(CH_2)_3$—$Si(OCH_3)_3$, $H_2N(CH_2)_2NH(CH_2)_3$—$Si(OCH_3)_3$, $H_2N(CH_2)_2NH(CH_2)_3$—$Si(OCH_3)_2CH_3$, cyclo-$C_6H_{11}NH(CH_2)_3$—$Si(OCH_3)_3$, cyclo-$C_6H_{11}NH(CH_2)_3$—$Si(OCH_3)_2CH_3$ and also their respective partial hydrolyzates are particularly preferable.

The (C) nitrogenous organosilicon compounds employed according to the invention are commercially available products and/or obtainable by chemically routine methods.

The amounts in which the compositions of the invention contain nitrogenous organosilicon compounds (C) are preferably from 0.2 to 25 parts by weight, more preferably from 0.3 to 20 parts by weight and specifically from 0.5 to 15 parts by weight, all based on 100 parts by weight of component (A).

The vinyltrimethoxysilane content of compositions according to the invention is preferably less than 0.3 wt %, more preferably less than 0.1 wt % and specifically less than 0.05 wt %, all based on the total weight of the composition according to the invention. In a particularly preferred embodiment of the invention, the composition according to the invention is free from vinyltrimethoxysilane.

The vinyltrialkoxysilane content of compositions according to the invention is preferably less than 0.3 wt %, more preferably less than 0.1 wt % and specifically less than 0.05 wt % of any vinyltrialkoxysilane, all based on 100 parts by weight of component (A). In a particularly preferred embodiment of the invention, the composition according to the invention is free from any vinyltrialkoxysilanes.

In addition to the (A), (B) and (C) components employed, the compositions according to the invention may contain any further chemical entities as hitherto also used in crosslinkable compositions and other than components (A), (B) and (C), examples being nonreactive plasticizers (D), fillers (E), adhesion promoters (F), silicone resins (G), catalysts (H), additives (I) and admixture agents (J).

Nonreactive plasticizers (D) within the purview of the present invention are any organic compounds which at temperatures <80° C. react neither with water nor with components (A), (B) and (C), are liquid at 20° C. and 1013 hPa, have a boiling point >250° C. at 1013 hPa and are selected from the compound groups consisting of
  fully esterified aromatic or aliphatic carboxylic acids,
  fully esterified derivatives of phosphoric acid,
  fully esterified derivatives of sulfonic acids,
  branched or unbranched saturated hydrocarbons, polystyrenes,
polybutadienes,
polyisobutylenes,
polyesters, and
polyethers.

Examples of nonreactive plasticizers (D) are phthalic esters, e.g., dioctyl phthalate, diisooctyl phthalate and diundecyl phthalate; perhydrogenated phthalic esters, e.g., diisononyl 1,2-cyclohexanedicarboxylate and dioctyl 1,2-cyclohexanedicarboxylate; adipic esters, e.g., dioctyl adipate; benzoic esters; esters of trimellitic acid, glycol esters; esters of saturated alkanediols, e.g., 2,2,4-trimethyl-1,3-pentanediol monoisobutyrates and 2,2,4-trimethyl-1,3-pentanediol diisobutyrates; phosphoric esters; sulfonic esters; polyesters; polyethers, e.g., polyethylene glycols, polyTHF and polypropylene glycols having molar masses of preferably 200 to 22 000 g/mol; polystyrenes; polybutadienes; polyisobutylenes; paraffinic hydrocarbons; and high molecular weight branched hydrocarbons.

Preference for use as component (D) is given to plasticizers that are free from phthalic acid, such as perhydrogenated phthalic esters, esters of trimellitic acid, polyesters or polyethers.

Preference is given to using plasticizers (D) having molar masses, or, in the case of polymeric plasticizers, average molar masses $M_n$, of above 200 g/mol, more preferably of above 500 g/mol and specifically of above 900 g/mol. They preferably have molar masses and/or average molar masses Mn of not more than 20,000 g/mol, more preferably not more than 10,000 g/mol, specifically at most 8000 g/mol.

Plasticizer (D) more preferably comprises polyethers, in particular polyethylene glycols, polyTHF and polypropylene glycols, most preferably polypropylene glycols. Polyethers (D), which are preferred, have molar masses of preferably between 400 and 22,000 g/mol, more preferably between 800 and 12,000 g/mol and specifically between 1000 and 8000 g/mol.

When the compositions of the invention contain a plasticizer (D), the amounts are preferably from 10 to 200 parts by weight, more preferably from 20 to 100 parts by weight and specifically from 30 to 80 parts by weight, all based on 100 parts by weight of component (A). The compositions of the invention preferably do contain a plasticizer (D).

The fillers (E) optionally employed in the compositions of the invention may comprise any desired prior art fillers.

Examples of fillers (E) are nonreinforcing fillers, these being fillers preferably having a BET surface area of up to 50 $m^2$/g, such as quartz, diatomaceous earth, calcium silicate, zirconium silicate, talc, kaolin, zeolites, metal oxide powders, such as oxides of aluminum, of titanium, of iron or of zinc and/or mixed oxides thereof, barium sulfate, calcium carbonate, gypsum, silicon nitride, silicon carbide, boron nitride, glass powders and polymeric powders, such as polyacrylonitrile powders; reinforcing fillers, these being fillers having a BET surface area of more than 50 $m^2$/g, such as fumed silica, precipitated silica, precipitated chalk, carbon black, such as furnace and acetylene blacks and silicon-aluminum mixed oxides of large BET surface area; aluminum trihydroxide, fillers in the form of hollow beads, such as ceramic microbeads, elastic polymeric beads, glass beads or fibrous fillers. The recited fillers may be hydrophobicized fillers, for example due to treatment with organosilanes and/or organosiloxanes or with stearic acid or etherification of hydroxyl groups into alkoxy groups.

The fillers (E) optionally employed preferably comprise calcium carbonate, talc, aluminum trihydroxide and silica. Preferred types of calcium carbonate are ground or precipitated and optionally surface-treated with fatty acids such as stearic acid or salts thereof. Silica, which is preferred, preferably comprises fumed silica.

Optionally employed fillers (E) preferably have a moisture content of below 1 wt %, more preferably below 0.5 wt %.

When the compositions of the invention contain fillers (E), the amounts are preferably from 10 to 1000 parts by weight, more preferably from 40 to 500 parts by weight and specifically from 80 to 300 parts by weight, all based on 100 parts by weight of ingredient (A). The compositions of the invention preferably contain a filler (E).

In a particularly preferred embodiment of the invention, the compositions of the invention contain as a filler (E) a combination of
a) silica, specifically fumed silica, and
b) calcium carbonate, aluminum trihydroxide and/or talc.

When the compositions of the invention contain this particularly preferred combination of various fillers (E), they contain with preference from 1 to 50 parts by weight and more preferably from 5 to 20 parts by weight of silica, most preferably fumed silica, and preferably from 10 to 500 parts by weight, more preferably from 50 to 300 parts by weight, of calcium carbonate, aluminum trihydroxide, talc or mixtures thereof, all based on 100 parts by weight of ingredient (A).

In a further particularly preferred embodiment of the invention, the compositions of the invention contain as a filler (E) exclusively calcium carbonate, aluminum trihydroxide and/or talc preferably in amounts of altogether from 10 to 500 parts by weight, more preferably from 50 to 300 parts by weight, all based on 100 parts by weight of ingredient (A).

The adhesion promoters (F) optionally employed in the compositions of the invention may comprise any desired adhesion promoters hitherto described in systems curing by silane condensation.

Examples of adhesion promoters (F) are epoxysilanes, such as glycidoxypropyltrimethoxysilanes, glycidoxypropyl-methyldimethoxysilane, glycidoxypropyltriethoxysilane or glycidoxypropylmethyldiethoxysilane, 2-(3-triethoxysilyl-propyl)maleic anhydride, N-(3-trimethoxysilylpropyl)urea, N-(3-triethoxysilylpropyl)urea, N-(trimethoxysilylmethyl)urea, N-(methyldimethoxysilylmethyl)urea, N-(3-triethoxysilylmethyl)-urea, N-(3-methyldiethoxysilylmethyl)urea, O-methylcarbamato-methylmethyldimethoxysilane, O-methylcarbamatomethyltrimethoxy-silane, O-ethylcarbamatomethylmethyldiethoxysilane, O-ethyl-carbamatomethyltriethoxysilane, 3-methacryloyloxypropyltrimethoxysilane, methacryloyloxymethyltrimethoxysilane, methacryloyloxymethylmethyldimethoxysilane, methacryloyloxymethyltriethoxysilane, methacryloyloxymethylmethyldiethoxysilane, 3-acryloyloxypropyltrimethoxysilane, acryloyloxymethyltrimethoxysilane, acryloyloxymethyl-methyldimethoxysilanes, acryloyloxymethyltriethoxysilane and acryloyloxymethylmethyldiethoxysilane and also partial condensates thereof.

When the compositions of the invention contain adhesion promoters (F), the amounts are preferably from 0.5 to 30 parts by weight and more preferably from 1 to 10 parts by weight, all based on 100 parts by weight of crosslinkable composition.

The silicone resins (G) optionally employed in the compositions of the invention preferably comprise phenylsilicone resins. More preferably, the (G) silicone resins optionally employed according to the invention comprise silicone resins consisting to an extent of 80%, preferably to an extent of 90% and specifically exclusively of T units of the formulae $PhSiO_{3/2}$, $PhSi(OR^6)O_{2/2}$ and/or $PhSi(OR^6)_2O_{1/2}$, where Ph represents phenyl and $R^6$ represents a hydrogen atom or optionally halogen-substituted alkyl moieties having 1 to 10 carbon atoms, preferably unsubstituted alkyl moieties having 1 to 4 carbon atoms, all based on the total number of units.

The average molar mass (number average) $M_n$ of the (G) silicone resins optionally employed according to the invention is preferably at least 400 g/mol and more preferably at least 600 g/mol. The average molar mass $M_n$ is preferably at most 400,000 g/mol, more preferably at most 10,000 g/mol and specifically at most 3000 g/mol.

The silicone resins (G) employed according to the invention may be not only solid but also liquid at 23° C. and 1000 hPa, and silicone resins (G) are preferably liquid. The viscosity of silicone resins (G) is preferably in the range from 10 to 100,000 mPas, preferably from 50 to 50,000 mPas and specifically ("most preferably") from 100 to 20,000 mPas.

The silicone resins (G) are usable not only in pure form but also in the form of a mixture with a suitable solvent, although a use in pure form is preferred.

Examples of phenylsilicone resins useful as components (G) are commercially available products, e.g., various SIL-RES® grades from Wacker Chemie AG, such as SILRES® IC 368, SILRES® IC 678, SILRES® IC 231, and SILRES® SY231.

When the compositions of the invention contain a component (G), the amounts are preferably at least 1 part by weight, more preferably at least 5 parts by weight, specifically at least 10 parts by weight and preferably at most 1000 parts by weight, more preferably at most 500 parts by weight, specifically at most 300 parts by weight, all based on 100 parts by weight of mixture (A).

The catalysts (H) optionally employed in the compositions of the invention may comprise any desired prior art catalysts for compositions curing by silane condensation.

Examples of metal-containing curative catalysts (H) are organic compounds of titanium and of tin, examples being titanic esters such as tetrabutyl titanate, tetrapropyl titanate, tetraisopropyl titanate and titanium tetraacetylacetonate; tin compounds such as dibutyltin dilaurate, dibutyltin maleate, dibutyltin diacetate, dibutyltin dioctanoate, dibutyltin acetylacetonate, dibutyltin oxides and corresponding dioctyltin compounds.

Examples of metal-free curative catalysts (H) are basic compounds such as triethylamine, tributylamine, 1,4-diazabicyclo[2,2,2]octane, 1,5-diazabicyclo[4.3.0]non-5-ene, 1,8-diazabicyclo[5.4.0]undec-7-ene, N,N-bis(N,N-dimethyl-2-amino-ethyl)methylamine, pentamethylguanidine, tetramethylguanidine and also further guanidine derivatives, N,N-dimethylcyclohexyl-amine, N,N-dimethylphenylamine and N-ethylmorpholine.

Catalyst (H) may likewise utilize acidic compounds, such as phosphoric acid and its partial esters, toluenesulfonic acid, sulfuric acid, nitric acid or else organic acids of carbon, e.g., acetic acid and benzoic acid.

In one embodiment of the invention, the catalysts (H) optionally employed comprise metal-containing curative catalysts, preferably tin-containing catalysts. This embodiment of the invention is preferable particularly when component (A) consists wholly or at least partly, i.e., to an extent of at least 90% wt %, preferably to an extent of at least 95 wt %, of compounds of formula (I) where b does not equal 1.

When the compositions of the invention contain catalysts (H), the amounts are preferably from 0.01 to 20 parts by weight, more preferably from 0.05 to 5 parts by weight, all based on 100 parts by weight of ingredient (A).

When component (A) consists wholly or at least partly, i.e., to an extent of at least 20 wt %, preferably to an extent of at least 40 wt %, of compounds of formula (I) where b equals 1, it is preferable to use no catalyst (H). When, by contrast, component (A) consists wholly or at least partly, i.e., to an extent of at least 90 wt %, preferably to an extent of at least 95 wt %, of compounds of formula (I) where b does not equal 1, it is preferable to use a catalyst (H).

The additives (I) optionally employed in the compositions of the invention may comprise any desired prior art additives typical for silane-crosslinking systems.

The additives (I) optionally employed according to the invention preferably comprise antioxidants, UV stabilizers, e.g., HALS compounds, fungicides and pigments.

When the compositions of the invention contain additives (I), the amounts are preferably from 0.01 to 30 parts by weight, more preferably from 0.1 to 10 parts by weight, all based on 100 parts by weight of ingredient (A). The compositions of the invention preferably do contain additives (I).

The admixture agents (J) optionally employed according to the invention preferably comprise tetraalkoxysilanes, e.g., tetraethoxysilane and/or partial condensates thereof, reactive plasticizers, rheology modifiers, flame retardants and organic solvents.

Preferred reactive plasticizers (J) are compounds containing alkyl chains of 6 to 40 carbon atoms and possessing a group reactive toward compounds (A), more preferably trialkoxysilanes having SiC-bonded alkyl groups of 6 to 40 carbon atoms. Examples are isooctyltrimethoxysilane, isooctyltriethoxysilane, N-octyltrimethoxysilane, N-octyltriethoxysilane, decyltrimethoxysilane, decyltriethoxysilane, dodecyltrimethoxy-silane, dodecyltriethoxysilane, tetradecyltrimethoxysilane, tetradecyltriethoxysilane, hexadecyltrimethoxysilane and also hexadecyltriethoxysilane.

Rheology modifiers (J) preferably comprise polyamide waxes, hydrogenated castor oils or stearates.

Flame retardants (J) may be any flame retardant typical for adhesive and sealant systems, specifically halogenated compounds and derivatives.

Examples of organic solvents (J) are low molecular weight ethers, esters, ketones, aromatic and aliphatic and also optionally halogen-containing hydrocarbons and alcohols, the latter being preferred.

Preferably, no organic solvents (J) are added to the compositions of the invention.

When the compositions of the invention contain one or more components (J), the amounts are in each case preferably from 0.5 to 200 parts by weight, more preferably from 1 to 100 parts by weight and specifically from 2 to 70 parts by weight, all based on 100 parts by weight of component (A).

The compositions of the invention preferably comprise those containing (A) 100 parts by weight of a compound of formula (I),
(B) 0.5 to 50 parts by weight of phenyltrimethoxysilane,
(C) 0.2 to 25 parts by weight of a nitrogenous organosilicon compound containing a unit of formula (III),
optionally
(D) a plasticizer,
optionally
(E) a filler,
optionally
(F) an adhesion promoter,
optionally
(G) a phenylsilicone resin,
optionally
(H) a catalyst,
optionally
(I) an additive, and
optionally
(J) an admixture agent,
wherein the composition according to the invention contains less than 0.3 wt % of vinyltrimethoxysilane, based on the total weight of the composition according to the invention.

More preferably, the compositions of the invention comprise those containing
(A) 100 parts by weight of a compound of formula (I),
(B) 0.8 to 30 parts by weight of phenyltrimethoxysilane,
(C) 0.3 to 20 parts by weight of a nitrogenous organosilicon compound containing a unit of formula (III),
optionally
(D) a plasticizer,
(E) 50 to 500 parts by weight of a filler,
optionally
(F) an adhesion promoter,
optionally
(G) a phenylsilicone resin,
optionally
(H) a catalyst,
optionally
(I) an additive, and
optionally
(J) an admixture agent,
wherein the composition according to the invention contains less than 0.1 wt % of vinyltrimethoxysilane, based on the total weight of the composition according to the invention.

The compositions of the invention specifically comprise those containing
(A) 100 parts by weight of a compound of formula (I) where Y represents polyurethane moieties or polyoxyalkylene moieties,
(B) 0.8 to 30 parts by weight of phenyltrimethoxysilane,
(C) 0.3 to 10 parts by weight of a nitrogenous silane of formula (III),
optionally
(D) a plasticizer,
(E) 50 to 500 parts by weight of a filler, selected from calcium carbonate, talc, aluminum trihydroxide and silica,
optionally
(F) an adhesion promoter,
optionally
(G) a phenylsilicone resin,
optionally
(H) a catalyst,
optionally
(I) an additive, and
optionally
(J) an admixture agent,
wherein the composition according to the invention contains less than 0.1 wt % of vinyltrialkoxysilane, based on the total weight of the composition according to the invention.

The recited components (A) to (J) aside, the compositions of the invention preferably contain no further ingredients.

The components employed according to the invention may in each case comprise a mixture of at least two species of such a component as well as one species of a particular component.

The compositions of the invention preferably comprise liquid to pasty materials having viscosities of preferably 5000 and 1,000,000 mPas, more preferably of 10,000 and 500,000 mPas, all at 25° C.

Different methods of viscosity determination are employed depending on the use intended for the compositions of the invention, which selectively require pasty or, alternatively, flowable formulations. Pasty compositions differ from flowable compositions in that absent external shearing forces they do not, even in the uncured state, display any propensity to flow and thus also no change in shape for an exported dollop of the composition. Flowable compositions, by contrast, will flow even absent external shearing forces.

The viscosity of pasty compositions, such as adhesives and joint sealants, is determined in accordance with DIN EN ISO 3219 with a plate-cone viscometer (MCR3XX from A. Paar) at rotation speeds of 10 Hz after conditioning to 25° C.

The viscosity of flowable compositions, preferably sealants, specifically for areal seals, is determined in accordance with ISO 2555 using a DV 3 P rotary viscometer from A. Paar (Brookfield systems) by use of spindle 6 at 50 Hz after conditioning to 23° C.

The compositions of the invention are obtainable in any desired conventional manner, for instance according to methods and mixing processes of the type customary in the manufacture of moisture-curing compositions. The order in which the various ingredients are mixed with each other may be varied in any desired manner.

The present invention further provides a method of forming the composition according to the invention by mixing the individual components in any desired order.

This mixing may take place at room temperature and the pressure of the ambient atmosphere, i.e., about 900 to 1100 hPa. If desired, however, this mixing may also take place at higher temperatures, for example at temperatures in the range from 30 to 130° C. It is further possible to mix temporarily or continuously under reduced pressure, for example at 30 to 500 hPa absolute pressure, in order to remove volatile compounds and/or air.

The mixing of the invention preferably takes place in the absence of moisture.

The method of the invention may be carried out in a continuous, semi-continuous or batchwise manner.

The compositions of the invention preferably comprise one-component crosslinkable compositions. However, the compositions of the invention may also be part of two-component crosslinking systems where OH-containing compounds, such as water, are added in a second component.

The compositions of the invention are storable in the absence of water and crosslinkable on accession of water. The customary water content of air is sufficient to crosslink the compositions of the invention. The compositions of the invention are preferably crosslinked at room temperature. The crosslinking of the compositions according to the invention may if desired also be carried out at higher or lower temperatures than room temperature, for example at −5° to 15° C. or at 30° to 50° C., and/or by means of concentrations of water which exceed the normal water content of air.

Crosslinking is preferably carried out at a pressure of 100 to 1100 hPa, in particular at the pressure of the ambient atmosphere, i.e., about 900 to 1100 hPa.

The present invention further provides shaped articles obtained by crosslinking the compositions of the invention.

The shaped articles of the invention may be any desired shaped articles, for instance gaskets, compression moldings, extruded profiles, coatings, impregnations, encapsulation, lenses, prisms, polygonal structures, laminate layers or adhesive layers.

The present invention further provides a method of forming a composite, which method comprises the composition according to the invention being applied atop at least one substrate and then being allowed to crosslink.

Examples thereof are coatings, encapsulation, the manufacture of formed articles, composite materials and composite moldings. By composite moldings herein are meant a unitary article formed from a composite material and composed of a crosslinked product of compositions according to the invention and at least one substrate such that there is a firm, durable bond between the two parts.

In the method of forming composites in the manner of the present invention, the composition of the invention may also be vulcanized between at least two identical or different substrates, as in the case of adherences, laminates or encapsulations for example.

Examples of substrates sealable or adherable according to the invention are plastics including PVC, concrete, wood, mineral substrates, metals, roofing felts, woven fiber, glass, ceramics and painted surfaces.

The compositions of the invention are employable for any purposes wherefor compositions that are storable in the absence of moisture and on accession of water crosslink at room temperature to form elastomers are employable.

The compositions of the invention are thus very useful as, for example, close-out materials for joints, including perpendicularly extending joints, and similar gaps of, for example, 10 to 40 mm in clear width, in, for example, buildings and land, water and air vehicles.

The compositions of the invention are further useful to seal off surfaces against the penetration of water. They are useful for sealing off surfaces on the outsides of buildings, on the insides of buildings (in, for example, wet rooms, in which case the coated surfaces may thereafter also be additionally overlaid with tiles or other decorative materials), roofs and the like. When used to seal off surfaces, the compositions of the invention are preferably applied in a layer or coat thickness of 0.1 to 5 mm. For this they are preferably so low in viscosity that they can be applied using a brush, a roller, a squeegee or a commercial spraying appliance such as an Airless gun. Preferably, the compositions of the invention which are used for sealing off surfaces exhibit thixotropic characteristics, so they can be applied not only to horizontal but also to vertical surfaces.

The compositions of the invention are further useful as adhesives or cementing compounds, for example in window construction or in the manufacture of glass cabinets, and also, for example, in the manufacture of protective overcoats or of anti-slip overcoats or of shaped rubbery articles and also for the isolation/insulation of electric or electronic apparatus.

The compositions of the invention have the advantage of being easy to make.

The crosslinkable compositions of the invention have the advantage of a very high stability in storage and a high rate of crosslinking.

The crosslinkable compositions of the invention further have the advantage of an excellent profile of adherence.

The crosslinkable compositions of the invention further have the advantage of being easy to process.

The compositions of the invention further have advantage that the phenyltrialkoxysilane used, specifically phenyltrimethoxysilane, combines a high reactivity with a low level of volatility.

Unless otherwise stated, the examples which follow are carried out at a pressure of the ambient atmosphere, i.e., say at 1000 hPa, and at room temperature, i.e., at about 23° C., and/or at a temperature as becomes established on the reactants being added together at room temperature without additional heating or cooling, and also at a relative humidity of about 50%. Parts and percentages are further all by weight, unless otherwise stated.

EXAMPLE 1

Forming a Composition for an Elastic Adhesive of High Shore Hardness 135.0 g of silane-terminated polypropylene glycol having an average molar mass ($M_n$) of 18,000 g/mol and end groups of the formula —O—C(=O)—NH—CH$_2$—SiCH$_3$(OCH$_3$)$_2$ (commercially available from Wacker Chemie AG, D-Munich, under the designation GENIOSIL® STP-E30) are homogenized in a laboratory-type planetary mixer from PC-Laborsystem, equipped with two beam-type mixers, with 8.0 g of phenyltrimethoxysilane, 4.0 g of N-(methyldimethoxy-silyl)methyl-O-methylcarbamate (commercially available from Wacker Chemie AG, D-Munich, under the designation GENIOSIL® XL 65), 4.0 g of 3-glycidoxypropyltrimethoxysilane and 2.0 g of a stabilizer mixture (commercially available as TINUVIN® B 75 from BASF SE, Germany, as a mixture of 20% Irganox® 1135 (CAS registry number 125643-61-0), 40% Tinuvin® 571 (CAS registry number 23328-53-2) and 40% Tinuvin® 765 (CAS registry number 41556-26-7)) at about 25° C. and at 200 rpm for 2 minutes. Thereafter, 231.0 g of chalk having a BET surface area of about 5 m$^2$/g and containing less than 1.5% of particles having a diameter of above 10 μm (commercially available as "Carbital™ 110" from Imersys) and 6.0 g of a hydrophobic fumed silica having a BET surface area of about 200 m$^2$/g (commercially available as HDK® H18 from Wacker Chemie AG, D-Munich) are destructurized by stirring at 600 rpm for one minute. Thereafter, 10.0 g of aminopropyltrimethoxysilane are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C1

Forming a Composition for an Elastic Adhesive of High Shore Hardness

Example 1 is repeated except that 8 g of vinyltrimethoxysilane are used instead of 8 g of phenyltrimethoxysilane.

EXAMPLE 2

Forming a Composition for an Elastic Adhesive of Medium Shore Hardness 50.0 g of silane-terminated polypropylene glycol having an average molar mass ($M_n$) of 12,000 g/mol and end groups of the formula —O—C(=O)—NH—CH$_2$—SiCH$_3$(OCH$_3$)$_2$ (commercially available from Wacker Chemie AG, D-Munich, under the designation GENIOSIL® STP-E10), 50.0 g of silane-terminated polypropylene glycol having an average molar mass ($M_n$) of 18,000 g/mol and end groups of the formula —O—C(=O)—NH—(CH$_2$)$_3$—Si(OCH$_3$)$_3$ (commercially available from Wacker Chemie AG, D-Munich, under the designation GENIOSIL® STP-E35) and 50.8 g of a polypropylene glycol having an average molar mass $M_n$ of 2000 g/mol are mixed and, in a laboratory-type planetary mixer from PC-Laborsystem, equipped with two beam-type mixers, homogenized at about 25° C. with 8.0 g of phenyltrimethoxysilane and 2.0 g of a stabilizing mixture (commercially available from BASF SE, Germany, under the designation TINUVIN® B 75) at 200 rpm for 2 minutes. Thereafter, 223.2 g of chalk having a BET surface area of 3 m$^2$/g and a d50 value of 0.45 μm (commercially available from Imerys under the designation "Imerseal 50") and 12.0 g of a hydrophobic fumed silica having a BET surface areas of about 200 m$^2$/g (commercially available from Wacker Chemie AG, D-Munich, under the designation HDK® H18) are destructurized by stirring at 600 rpm for one minute. Thereafter, 4.0 g of aminopropyltrimethoxysilane are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C2

Forming a Composition for an Elastic Adhesive of Medium Shore Hardness

Example 2 is repeated except that 8 g of vinyltrimethoxysilane are used instead of 8 g of phenyltrimethoxysilane.

EXAMPLE 3

Forming a Composition for a Transparent Elastic Adhesive of Low Shore Hardness 101.0 g of silane-terminated polypropylene glycol having an average molar mass ($M_n$) of 12,000 g/mol and end groups of the formula —O—C(=O)—NH—CH$_2$—SiCH$_3$(OCH$_3$)$_2$ (commercially available from Wacker Chemie AG, D-Munich, under the designation GENIOSIL® STP-E10), 101 g of silane-terminated polypropylene glycol having an average molar mass ($M_n$) of 18,000 g/mol and end groups of the formula —O—C(=O)—NH—(CH$_2$)$_3$—Si(OCH$_3$)$_3$ (commercially available from Wacker Chemie AG, D-Munich, under the designation GENIOSIL® STP-E35) and 139.6 g of diisononyl cyclohexane-1,2-dicarboxylate (commercially available as "Hexamoll DINCH" from BASF AG) are mixed and, in a laboratory-type planetary mixer from PC-Laborsystem, equipped with two beam-type mixers, homogenized at about 25° C. with 8.0 g of phenyltrimethoxysilane, 1.2 g of stabilizer (commercially available as TINUVIN® 123 from BASF SE, Germany; CAS registry number: 129757-67-1) and 3.2 g of stabilizer (commercially available as Hostavin® 3206 from Clariant, Switzerland; CAS registry number: 82493-14-9) at 200 rpm for 2 minutes. Thereafter, 19.0 g of a hydrophobic fumed silica having a BET surface area of about 200 m$^2$/g (commercially available as HDK® H18 from Wacker Chemie AG, D-Munich) and 19.0 g of a hydrophilic fumed silica having a BET surface area of about 200 m$^2$/g (commercially available as HDK® N20 from Wacker Chemie AG, D-Munich) are destructurized by stirring at 600 rpm for one minute. Thereafter, 8.0 g of aminopropyltrimethoxysilane are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C3

Forming a Composition for a Transparent Elastic Adhesive of Low Shore Hardness Example 3 is repeated except that 8 g of vinyltrimethoxysilane are used instead of 8 g of phenyltrimethoxysilane.
Properties of Adhesives The compositions obtained in Examples 1 to 3 and also the corresponding Comparative Examples 1 to 3 were allowed to crosslink and evaluated with regard to skin formation, mechanical properties and storage stability. The results are found in Table 1.
Skin Formation Time (SFT)

To determine their skin formation time, the crosslinkable compositions obtained in the examples are applied in a 2 mm thick layer atop PE foil and stored under standard conditions (23° C. and 50% relative humidity). During cure, the formation of a skin is tested for every 5 min. To this end, a dry laboratory spatula is carefully placed on the surface of the sample and pulled in the upward direction. If the sample sticks to the finger, a skin is yet to form. If the sample no longer sticks to the finger, a skin has formed and the time is recorded.
Viscosity of Uncured Adhesives The viscosity of pasty and thixotropic adhesives is determined in accordance with DIN EN ISO 3219 using a plate-cone viscometer (MCR3XX from A. Paar), at rotation speeds of 1 Hz and 10 Hz after conditioning to 25° C.
Storage Stability The cartridges in question were stored at 70° C. for the periods reported in each case. Thereafter, the skin formation time is determined as described above.
Mechanical Properties of Cured Adhesives The compositions were each spread out atop milled Teflon plates to a depth of 2 mm and cured at 23° C./50% relative humidity for 2 weeks.

Shore A hardness is determined to DIN 53505.

Tensile strength is determined to DIN 53504-51.

Elongation at break is determined to DIN 53504-51.

TABLE 1

| Composition from Example | 1 | C1 | 2 | C2 | 3 | C3 |
|---|---|---|---|---|---|---|
| SFT [min] | 15 | 16 | 37 | 37 | 45 | 29 |
| storage at 70° C.: | | | | | | |
| SFT after 1 week [min] | 23 | 20 | 78 | 65 | 43 | 45 |
| SFT after 2 weeks [min] | 24 | 20 | 87 | 73 | 50 | 43 |
| SFT after 4 weeks [min] | 24 | 25 | 94 | 70 | 58 | 39 |
| SFT after 8 weeks [min] | 23 | 23 | 84 | 77 | 47 | 40 |
| viscosity 1 Hz [Pas] | 725 | 589 | 1530 | 1431 | 1853 | 1937 |

TABLE 1-continued

| Composition from Example | 1 | C1 | 2 | C2 | 3 | C3 |
|---|---|---|---|---|---|---|
| viscosity 10 Hz [Pas] | 237 | 179 | 333 | 273 | 170 | 139 |
| Shore A hardness | 76 | 76 | 51 | 55 | 31 | 33 |
| tensile strength [N/mm$^2$] | 2.9 | 3.4 | 1.9 | 1.8 | 1.7 | 1.6 |
| elongation at break [%] | 100 | 112 | 467 | 390 | 240 | 208 |

The compositions from Comparative Examples 1 to 3 (C1 to C3) are notable for an intensive vinyltrimethoxysilane odor after application. This odor continues to be distinctly noticeable for several hours even after skin formation is complete. The compositions from Examples 1 to 3, which are in accordance with the invention, are substantially odorless, by contrast.

EXAMPLE 4

Forming a Composition for an Elastic Adhesive for Parquet 40.0 g of silane-terminated polypropylene glycol having an average molar mass ($M_n$) of 12,000 g/mol and end groups of the formula —O—C(═O)—NH—CH$_2$—SiCH$_3$(OCH$_3$)$_2$ (commercially available from Wacker Chemie AG, D-Munich, under the designation GENIOSIL® STP-E10) and 60.0 g of diisononyl cyclohexane-1,2-dicarboxylate (commercially available as "Hexamoll DINCH" from BASF AG) are mixed and, in a laboratory-type planetary mixer from PC-Laborsystem, equipped with two beam-type mixers, homogenized with 8.0 g of phenyltrimethoxysilane at about 25° C. at 200 rpm for 2 minutes. Thereafter, 272.0 g of marble powder having a median particle diameter (D50%) of about 5 μm (commercially available under the designation Omyacarb 5-GU from Shiraishi Omya GmbH, AT-Gummern) and 16.0 g of a fatty acid-coated precipitated chalk having a median particle diameter (D50%) of about 0.07 μm (commercially available as Hakuenka CCR S10 from Shiraishi Omya GmbH, AT-Gummern) are destructurized by stirring at 600 rpm for one minute. Thereafter, 4.0 g of aminopropyltrimethoxysilane are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C4

Forming a Composition for an Elastic Adhesive for Parquet

Example 4 is repeated except that 8 g of vinyltrimethoxysilane are used instead of 8 g of phenyltrimethoxysilane.

EXAMPLE 5

Forming a Composition for a Hard-Elastic Adhesive for Parquet 56.0 g of silane-terminated polypropylene glycol having an average molar mass ($M_n$) of 12,000 g/mol and end groups of the formula —O—C(═O)—NH—(CH$_2$)$_3$—Si(OCH$_3$)$_3$ (commercially available from Wacker Chemie AG, D-Munich, under the designation GENIOSIL® STP-E15) and 56.0 g of a polypropylene glycol having an average molar mass $M_n$ of 2000 g/mol are mixed and, in a laboratory-type planetary mixer from PC-Laborsystem, equipped with two beam-type mixers, homogenized with 8.0 g of phenyltrimethoxysilane at about 25° C. at 200 rpm for 2 minutes. Thereafter, 259.9 g of marble powder having a median particle diameter (D50%) of about 5 μm (commercially available under the designation Omyacarb 5-GU from Shiraishi Omya GmbH, AT-Gummern) and 16.0 g of a fatty acid-coated precipitated chalk having a median particle diameter (D50%) of about 0.07 μm (commercially available as Hakuenka CCR S10 from Shiraishi Omya GmbH, AT-Gummern) are destructurized by stirring at 600 rpm for one minute. Thereafter, 4.0 g of aminopropyltrimethoxysilane and 0.1 g of dioctyltin dilaurate are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C5

Forming a Composition for a Hard-Elastic Adhesive for Parquet

Example 5 is repeated except that 8 g of vinyltrimethoxysilane are used instead of 8 g of phenyltrimethoxysilane.

EXAMPLE 6

Forming a Composition for a Hard-Elastic Adhesive for Parquet 56.0 g of silane-terminated polypropylene glycol having an average molar mass ($M_n$) of 18,000 g/mol and end groups of the formula —O—C(═O)—NH—(CH$_2$)$_3$—Si(OCH$_3$)$_3$ (commercially available from Wacker Chemie AG, D-Munich, under the designation GENIOSIL® STP-E35) and 60.0 g of a polypropylene glycol having an average molar mass $M_n$ of 2000 g/mol are mixed and, in a laboratory-type planetary mixer from PC-Laborsystem, equipped with two beam-type mixers, homogenized with 8.0 g of phenyltrimethoxysilane at about 25° C. at 200 rpm for 2 minutes. Thereafter, 251.9 g of marble powder having a median particle diameter (D50%) of about 5 μm (commercially available under the designation Omyacarb 5-GU from Shiraishi Omya GmbH, AT-Gummern) and 20.0 g of a fatty acid-coated precipitated chalk having a median particle diameter (D50%) of about 0.07 μm (commercially available as Hakuenka CCR S10 from Shiraishi Omya GmbH, AT-Gummern) are destructurized by stirring at 600 rpm for one minute. Thereafter, 4.0 g of aminopropyltrimethoxysilane and 0.1 g of dioctyltin dilaurate are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C6

Forming a Composition for a Hard-Elastic Adhesive for Parquet

Example 6 is repeated except that 8 g of vinyltrimethoxysilane are used instead of 8 g of phenyltrimethoxysilane.

Properties of Adhesives for Parquet

The compositions obtained in Examples 4 to 6 and also the corresponding Comparative Examples C4-C6 were allowed to crosslink and evaluated with regard to skin formation and mechanical properties. The results are found in Table 2.

Skin formation time, Shore hardness, tensile strength and elongation at break were determined as described in Examples 1-3.

Viscosity of Uncured Adhesives

The viscosity of pasty and thixotropic adhesives is determined in accordance with DIN EN ISO 3219 using a plate-cone viscometer (MCR3XX from A. Paar), at rotation speeds of 0.89 Hz and 25 Hz after conditioning to 25° C.

Tensile Shear Strength

Tensile shear strengths are determined as described in DIN EN 204. The adhesive is applied to both the beechwood slats to be bonded together, and is then drawn down with a 100 μm blade. The two pieces of wood are then joined together over an area of 1 by 2 cm under a contact pressure of 5 kg. After being held pressed together for a period of 24 hours, the pieces of wood are stored under standardized conditions (25° C., 50% relative humidity) for the reported period and subsequently measured.

TABLE 2

| Composition from Example | 4 | C4 | 5 | C5 | 6 | C6 |
|---|---|---|---|---|---|---|
| SFT [min] | 33 | 25 | 61 | 31 | 83 | 85 |
| viscosity 0.89 Hz [Pas] | 99 | 92 | 199 | 151 | 214 | 226 |
| viscosity 25 Hz [Pas] | 32 | 20 | 66 | 43 | 78 | 81 |
| Shore A hardness | 60 | 64 | 66 | 71 | 57 | 61 |
| tensile strength [N/mm$^2$] | 2.1 | 1.7 | 2.1 | 1.9 | 1.6 | 1.6 |
| elongation at break [%] | 76 | 40 | 64 | 55 | 104 | 93 |
| tensile shear strength after 3 days [N/mm$^2$] | 2.0 | 2.9 | 2.2 | 2.3 | 1.8 | 2.3 |
| tensile shear strength after 28 days [N/mm$^2$] | 2.3 | 2.2 | 3.0 | 2.6 | 2.7 | 3.2 |

The compositions from Comparative Examples 4 to 6 (V4 to V6) are notable for an intensive vinyltrimethoxysilane odor after application. This odor continues to be distinctly noticeable for several hours even after skin formation is complete. The compositions from Examples 4 to 6, which are in accordance with the invention, are substantially odorless, by contrast.

EXAMPLE 7

Forming a Composition for Sealing Coatings 66.7 g of silane-terminated polypropylene glycol having an average molar mass ($M_n$) of 12,000 g/mol and end groups of the formula —O—C(=O)—NH—CH$_2$—SiCH$_3$(OCH$_3$)$_2$ (commercially available from Wacker Chemie AG, D-Munich, under the designation GENIOSIL® STP-E10), 33.3 g of silane-terminated polypropylene glycol having an average molar mass ($M_n$) of 12,000 g/mol and end groups of the formula —O—C(=O)—NH—(CH$_2$)$_3$—Si(OCH$_3$)$_3$ (commercially available from Wacker Chemie AG, D-Munich, under the designation GENIOSIL® STP-E15), 78.4 g of hexadecyltrimethoxysilane (commercially available as Silan 25013 VP from Wacker Chemie AG, D-Munich) and 1.6 g of N-(methyldimethoxysilyl)methyl-O-methylcarbamate (commercially available from Wacker Chemie AG, D-Munich, under the designation GENIOSIL® XL 65) are mixed and, in a laboratory-type planetary mixer from PC-Labor-system, equipped with two beam-type mixers, homogenized at about 25° C. with 7.6 g of phenyltrimethoxysilane and a stabilizer mixture consisting of 0.8 g of TINUVIN® 123 (CAS registry number: 129757-67-1; commercially available from BASF SE, Germany), 2.0 g of Tinuvin® 571 (CAS registry number 23328-53-2 commercially available from BASF SE, Germany) and 0.8 g of Irganox® 1135 (CAS registry number 125643-61-0; commercially available from BASF SE, Germany) at 200 rpm for 2 minutes. Thereafter, 156.0 g of chalk having a BET surface area of 3 m$^2$/g and a d50 value of 0.45 μm (commercially available as "Imerseal 50" from Imerys), 44.0 g of aluminum trihydroxide having a BET surface area of 3-5 m$^2$/g and a d50 value of 1.7-2.1 μm (commercially available as Martinal® OL 104 from Albemarle Corp.) and 6.0 g of fumed silica having a BET surface area of about 200 m$^2$/g, and modified at the surface with trimethylsiloxy groups (commercially available as HDK® H2000 from Wacker Chemie AG, D-Munich) are destructurized by stirring at 600 rpm for one minute. Thereafter, 2.8 g of aminopropyltrimethoxysilane are mixed in at 200 rpm for 1 minute. This is lastly followed by stirring for 2 minutes at 600 rpm and for 1 minute at 200 rpm at a pressure of about 100 mbar to achieve homogenization and an absence of bubbles.

The formulation is filled into 310 ml PE cartridges and stored for one day at 25° C. before testing.

COMPARATIVE EXAMPLE C7

Forming a Composition for Sealing Coatings

Example 7 is repeated except that 7.6 g of vinyltrimethoxysilane are used instead of 7.6 g of phenyltrimethoxysilane.

Properties of Coatings

The compositions obtained in Example 7 and the corresponding Comparative Example 7 were allowed to crosslink and evaluated with regard to skin formation and mechanical properties. The results are found in Table 3.

Skin formation time, Shore hardness, tensile strength and elongation at break were determined as described in Examples 1-3.

Viscosity of Uncured Adhesives

The viscosity of the non-pasty sealants is determined in a DV 3 P rotary viscometer from A. Paar (Brookfield systems), by use of spindle 6 at 5 Hz and 50 Hz, determined in accordance with ISO 2555, after conditioning to 23° C.

TABLE 3

| Composition from Example | 7 | C7 |
|---|---|---|
| SFT [min] | 30 | 27 |
| viscosity 5 Hz [Pas] | 19.9 | 12.8 |
| viscosity 50 Hz [Pas] | 5.6 | 5.4 |
| Shore A hardness | 61 | 69 |
| tensile strength [N/mm$^2$] | 2.2 | 2.1 |
| elongation at break [%] | 163 | 171 |

The composition from Comparative Example 7 (V7) is notable for an intensive vinyltrimethoxysilane odor after application. This odor continues to be distinctly noticeable for several hours even after skin formation is complete. The composition from Example 7, which is in accordance with the invention, is substantially odorless, by contrast.

What is claimed is:

1. A crosslinkable composition, comprising:
   (A) an alkoxysilyl-terminated, crosslinkable polymer component, consisting essentially of 100 parts by weight of at least one compound of the formula $$Y-[(CR^1{}_2)_b-SiR_a(OR^2)_{3-a}]_x \quad (I),$$

where
   Y is an x-valent polymeric moiety attached via nitrogen, oxygen, sulfur or carbon,
   R at each occurrence are the same or different and are monovalent, optionally substituted hydrocarbyl moieties,
   $R^1$ at each occurrence are the same or different and are hydrogen or a monovalent, optionally substituted hydrocarbyl moiety, which is attached to the carbon atom via nitrogen, phosphorus, oxygen, sulfur or a carbonyl group,
   $R^2$ at each occurrence are the same or different and are hydrogen or a monovalent, optionally substituted hydrocarbyl moiety,
   x is an integer from 1 to 10,
   a at each occurrence are the same or different and are 0, or 1, and
   b at each occurrence are the same or different and are an integer from 1 to 10,
   (B) 0.2 to 50 parts by weight of a phenyltrialkoxysilane of the formula $$C_6H_5-Si(OR^3)_3 \quad (II),$$

where
   $R^3$ at each occurrence are the same or different and are methyl or ethyl,
   (C) 0.1 to 30 parts by weight of a nitrogenous organosilicon compound containing a unit of the formula $$D_eSi(OR^5)_dR^4{}_cO_{(4-e-d-c)/2} \quad (III),$$

where
   $R^4$ at each occurrence are the same or different and are monovalent, optionally substituted, SiC-bonded organic moieties free of nitrogen,
   $R^5$ at each occurrence are the same or different and are hydrogen or an optionally substituted hydrocarbyl moiety,
   D at each occurrence are the same or different and are monovalent SiC-bonded moieties having at least one nitrogen atom not bonded to a carbonyl group (C=O),
   c is 0, 1, 2 or 3,
   d is 1, 2 or 3, and
   e is 0, 1, 2, 3 or 4,
   with the proviso that the c+d+e sum is not more than 4 and at least one D moiety is present per molecule,
   wherein the crosslinkable composition contains less than 0.5 wt % of vinyltrimethoxysilane, based on the total weight of the crosslinkable composition.

2. The crosslinkable composition of claim 1, wherein the Y moiety comprises polyurethane moieties or polyoxyalkylene moieties.

3. The crosslinkable composition of claim 1, wherein component (B) is phenyltrimethoxysilane.

4. The crosslinkable composition of claim 1, wherein the composition contains less than 0.3 wt % of vinyltrimethoxysilane, based on the total weight of the composition.

5. The crosslinkable composition of claim 1, wherein the composition contains component (B) in an amount of 0.5 to 50 parts by weight, based on 100 parts by weight of component (A).

6. The crosslinkable composition of claim 1, comprising:
   (A) 100 parts by weight of a compound of formula (I),
   (B) 0.5 to 50 parts by weight of phenyltrimethoxysilane,
   (C) 0.2 to 25 parts by weight of a nitrogenous organosilicon compound containing a unit of formula (III),
   (D) optionally a plasticizer,
   (E) optionally a filler,
   (F) optionally an adhesion promoter,
   (G) optionally a phenylsilicone resin,
   (H) optionally a catalyst,
   (I) optionally an additive, and
   (J) optionally an admixture agent,
   wherein the composition contains less than 0.3 wt % of vinyltrimethoxysilane, based on the total weight of the composition.

7. The crosslinkable composition of claim 1, comprising:
   (A) 100 parts by weight of a compound of formula (I),
   (B) 0.8 to 30 parts by weight of phenyltrimethoxysilane,
   (C) 0.3 to 20 parts by weight of a nitrogenous organosilicon compound containing a unit of formula (III),
   (D) optionally a plasticizer,
   (E) optionally 50 to 500 parts by weight of a filler,
   (F) optionally an adhesion promoter,
   (G) optionally a phenylsilicone resin,
   (H) optionally a catalyst,
   (I) optionally an additive, and
   (J) optionally an admixture agent,
   wherein the composition contains less than 0.1 wt % of vinyltrimethoxysilane, based on the total weight of the composition.

8. A method of forming a composition of claim 1, comprising mixing the individual components in any order.

9. A shaped article obtained by crosslinking a composition of claim 1.

10. A method of forming a composite, comprising applying applying a composition of a claim 1 to a substrate and then crosslinking the compostion.

11. The crosslinkable composition of claim 1, wherein a is 0 in at least one compound of the formula (II).

12. The crosslinkable composition of claim 1, wherein all alkoxysilyl-terminated, crosslinkable polymers are of the formula (II) where a is 0.

13. A crosslinkable composition, comprising:
   (A) an alkoxysilyl-terminated, crosslinkable polymer component, consisting of 100 parts by weight of at least one compound of the formula $$Y-[(C^12)_b-SiR_a(OR^2)_{3-a}]_x \quad (I)$$

where
   Y is an x-valent polymeric moiety attached via nitrogen, oxygen, sulfur or carbon,
   R at each occurrence are the same or different and are monovalent, optionally substituted hydrocarbyl moieties,
   $R^1$ at each occurrence are the same or different and are hydrogen or a monovalent, optionally substituted hydrocarbyl moiety, which is attached to the carbon atom via nitrogen, phosphorus, oxygen, sulfur or a carbonyl group,
   $R^2$ at each occurrence are the same or different and are hydrogen or a monovalent, optionally substituted hydrocarbyl moiety,
   x is an integer from 1 to 10,
   a at each occurrence are the same or different and are 0, or 1, and
   b at each occurrence are the same or different and are an integer from 1 to 10, (B) 0.2 to 50 part by weight of a phenyltrialkoxysilane of the formula $$C_6H_5\text{—}Si(OR^3)_3 \qquad (II),$$

where
- $R^3$ at each occurrence are the same or different and are methyl or ethyl, (C) 0.1 to 30 parts by weight of a nitrogenous organosilicon compound containing a unit of the formula $$D_e Si(OR^5)_d R^4_c O_{(4-e-d-c)/2} \qquad (III)$$

where
- $R^4$ at each occurrence are the same or different and are monovalent, optionally substituted, SiC-bonded organic moieties free of nitrogen,
- $R^5$ at each occurrence are the same or different and are hydrogen or an optionally substituted hydrocarbyl moiety,
- D at each occurrence are the same or different and are monovalent SiC-bonded moieties having at least one nitrogen atom not bonded to a carbonyl group (C=O),
- c is 0, 1, 2 or 3,
- d is 1, 2 or 3, and
- e is 0, 1, 2, 3 or 4, with the proviso that the c+d+e sum is not more than 4 and at least one D moiety is present per molecule, wherein the crosslinkable composition contains less than 0.5 wt% of vinyltrimethoxysilane, based on the total weight of the crosslinkable composition.

* * * * *

UNITED STATES PATENT AND TRADEMARK OFFICE
CERTIFICATE OF CORRECTION

PATENT NO. : 10,040,908 B2
APPLICATION NO. : 15/314735
DATED : August 7, 2018
INVENTOR(S) : Volker Stanjek et al.

It is certified that error appears in the above-identified patent and that said Letters Patent is hereby corrected as shown below:

In the Claims

Column 24, Line 36, Claim 10:
After "applying a composition of"
Delete "a".

Column 24, Line 55, Claim 13:
Delete "$R^l$" and
Insert -- $R^1$ --.

Signed and Sealed this
First Day of January, 2019

Andrei Iancu
*Director of the United States Patent and Trademark Office*